(12) United States Patent
Beall et al.

(10) Patent No.: US 11,781,544 B2
(45) Date of Patent: Oct. 10, 2023

(54) ELECTRIC DRIVE SYSTEM FOR ROTORCRAFT

(71) Applicant: Bell Textron Inc., Fort Worth, TX (US)

(72) Inventors: Grant Beall, Arlington, TX (US); Stephen Yibum Chung, Keller, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 282 days.

(21) Appl. No.: 17/075,281

(22) Filed: Oct. 20, 2020

(65) Prior Publication Data

US 2022/0120261 A1    Apr. 21, 2022

(51) Int. Cl.
*F04C 2/10* (2006.01)
*F04C 15/00* (2006.01)

(52) U.S. Cl.
CPC ............ *F04C 2/102* (2013.01); *F04C 15/008* (2013.01); *F04C 15/0073* (2013.01)

(58) Field of Classification Search
CPC .. F04C 2/08; F04C 2/082; F04C 2/084; F04C 2/102; F04C 15/0057; F04C 15/0061; F04C 15/0073; F04C 15/008; F04C 29/0042; F04C 29/005; B64D 35/04; B64D 35/06
USPC ................... 417/319, 223, 316, 410.3, 410.4
See application file for complete search history.

(56) References Cited

U.S. PATENT DOCUMENTS

| | | | | |
|---|---|---|---|---|
| 3,958,494 A * | 5/1976 | Miller | ........................ | F03C 2/08 91/519 |
| 5,372,213 A | 12/1994 | Hasebe et al. | | |
| 6,398,531 B1 * | 6/2002 | Andres | .................... | F16D 31/04 192/85.61 |
| 2003/0213460 A1 * | 11/2003 | Schwam | ................ | B64D 35/06 418/86 |
| 2005/0249622 A1 * | 11/2005 | Sefcik | ................. | F04C 15/0061 417/310 |

(Continued)

FOREIGN PATENT DOCUMENTS

| DE | 102016220208 A1 * | 4/2018 | ............. F16D 41/08 |
|---|---|---|---|
| JP | 2008174069 A | 7/2008 | |
| WO | 2016020915 A1 | 2/2016 | |

OTHER PUBLICATIONS

EPO Examination Report issued in EP Application 21203139.7 dated Mar. 18, 2022, 8 pages.

(Continued)

*Primary Examiner* — Charles G Freay
*Assistant Examiner* — Chirag Jariwala
(74) *Attorney, Agent, or Firm* — Akona IP

(57) ABSTRACT

A rotor system comprising a driveshaft; at least one motor for providing rotational energy for the driveshaft; an overrunning clutch connected to the motor and disposed around the driveshaft, wherein the overrunning clutch is rotated by the at least one motor; and a pump assembly associated with the at least one motor, the pump assembly comprising a large bore through which the driveshaft passes such that the pump assembly is arranged concentric to the driveshaft, the pump assembly further comprising a gerotor pump comprising inner and outer gerotor pump gears, wherein an inner bore of the gerotor pump engages and is driven by the overrunning clutch; and a cover disposed over the gerotor pump for providing a sump for the gerotor pump.

20 Claims, 15 Drawing Sheets

(56) References Cited

U.S. PATENT DOCUMENTS

| | | |
|---|---|---|
| 2013/0043747 A1 | 2/2013 | Kubes |
| 2015/0053505 A1* | 2/2015 | Klowak ............... F01M 11/061 |
| | | 184/105.1 |
| 2015/0188367 A1 | 7/2015 | Lind et al. |
| 2017/0190435 A1 | 7/2017 | Kobayashi et al. |
| 2019/0312488 A1 | 10/2019 | Latulipe et al. |
| 2019/0329859 A1 | 10/2019 | Bevirt et al. |
| 2020/0381984 A1* | 12/2020 | Sercombe et al. ...... H02P 27/08 |

OTHER PUBLICATIONS

EPO Search Report issued in EP Application 21203139.7 dated Mar. 7, 2022, 4 pages.

\* cited by examiner

ELECTRIC DRIVE SYSTEM FOR ROTORCRAFT

TECHNICAL FIELD

This disclosure relates in general to the field of aircraft and, more particularly, though not exclusively, to a driveshaft concentric large bore oil pump for electric motors in such aircraft.

BACKGROUND

An electric motor may be used by aircraft as a power source for various functions, such as supplying rotational energy in an aircraft propulsion system. Such a motor will often have associated therewith an oil coolant pump, or simply "oil pump," which may be implemented as a gerotor. A gerotor is a positive displacement pump that includes an inner rotor that has n teeth and an outer rotor that has n+1 teeth, where n is at least 2. The rotational axis of the inner rotor is offset from the rotational axis of the outer rotor and the geometry of the two rotors partitions a volume between them into n different dynamically changing sub-volumes. During the gerotor's rotation cycle, each of the sub-volumes changes continuously, so any given sub-volume first increases and then decreases. An increase in volume creates a vacuum, resulting in suction; this is the part of the cycle where the inlet is disposed. A decrease in volume creates compression, corresponding to a pump; this is the part of the cycle where the outlet is disposed. Gerotor pumps are typically designed using a trochoidal inner rotor and an outer rotor formed by a circle with intersecting circular arcs.

Given that most aerospace oil pumps have a small inner bore gerotor, they are typically driven by a shaft and gear train off axis from the main driveshaft.

SUMMARY

One embodiment is a rotor system including a driveshaft; at least one motor for providing rotational energy for the driveshaft; an overrunning clutch connected to the motor and disposed around the driveshaft, wherein the overrunning clutch is rotated by the at least one motor; a pump assembly associated with the at least one motor, the pump assembly including a large bore through which the driveshaft passes such that the pump assembly is arranged concentric to the driveshaft, the pump assembly further including a gerotor pump including inner and outer gerotor pump gears, wherein an inner bore of the gerotor pump engages and is driven by the overrunning clutch; and a cover disposed over the gerotor pump for providing a sump for the gerotor pump.

Another embodiment is a rotorcraft including a rotor system, the rotor system including a driveshaft; at least one motor for providing rotational energy for the driveshaft; an overrunning clutch connected to the motor and disposed around the driveshaft, wherein the overrunning clutch is rotated by the at least one motor; a pump assembly associated with the at least one motor, the pump assembly including a large bore through which the driveshaft passes such that the pump assembly is arranged concentric to the driveshaft, the pump assembly further including a gerotor pump including inner and outer gerotor pump gears, wherein an inner bore of the gerotor pump engages and is driven by the overrunning clutch; and a cover disposed over the gerotor pump for providing a sump for the gerotor pump.

Yet another embodiment is a pump assembly associated with a motor, the pump assembly including a large bore through which a driveshaft driven by the motor passes such that the pump assembly is arranged concentric to the driveshaft, the pump assembly further including a gerotor pump including inner and outer gerotor pump gears, wherein an inner bore of the gerotor pump engages and is driven by an overrunning clutch rotated by the motor and through which the drive shaft passes; and a cover disposed over the gerotor pump for providing a sump for the gerotor pump.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
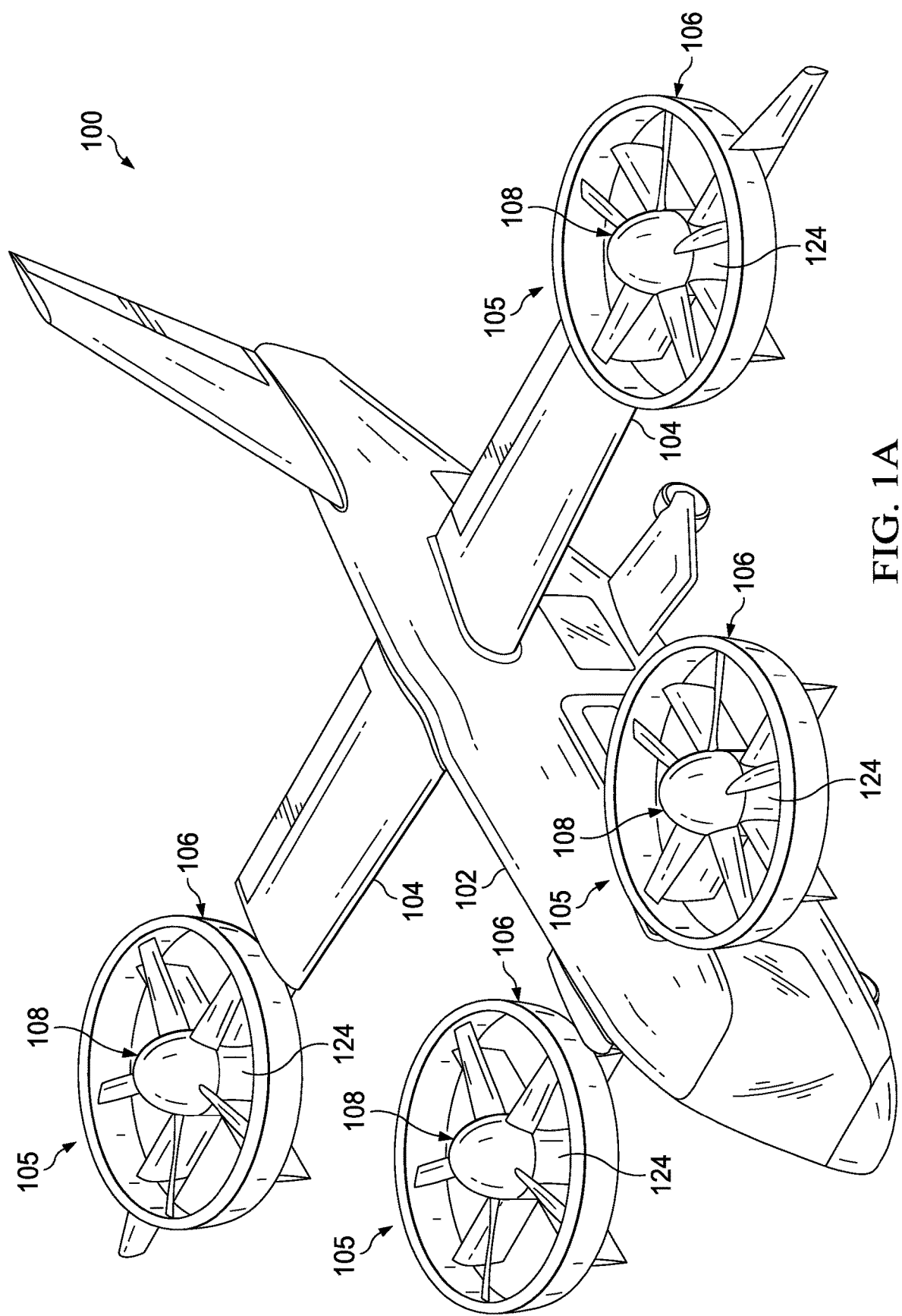
FIGS. 1A-1B illustrate a tilting ducted rotor aircraft including at least one electric motor and gearbox unit including driveshaft concentric large bore oil pumps for each of the motors in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is an integrated oil coolant pump for an electric motor in an aircraft, such as a vertical take-off and landing (VTOL) aircraft. The system includes gerotor pump gears in a custom housing and custom sump cover. Gerotor pump gears, by design, leak a small amount of oil around their driven inner core and therefore must be disposed within a sump of some sort. In accordance with embodiments described herein, the pump operates concentric to the driveshaft, thereby saving a great deal of space and weight versus being driven by a separate shaft and gear train off axis of the main driveshaft. This is enabled by the fact that the gerotor has a large enough inner bore to slip over the driveshaft. The sump cover design and seal allow for the sump to reside in a small reservoir of fluid concentric to the driveshaft. As will be described in greater detail hereinbelow the pump is driven off the outer housing of the overrunning clutch and allows for the electric motor and gearbox unit to rotate vertically in hover mode and horizontally in airplane mode. As the pump is not locate in a high point of the system in either mode, the pump can be purged of air upon filling and will not have air enter the sump during operation. Benefits of the system include weight reduction due to minimization of the number of components required to drive the pump, as well as a reduction in space required to house the pump, as it fits within the existing motor stack envelope.

Figure 1B:
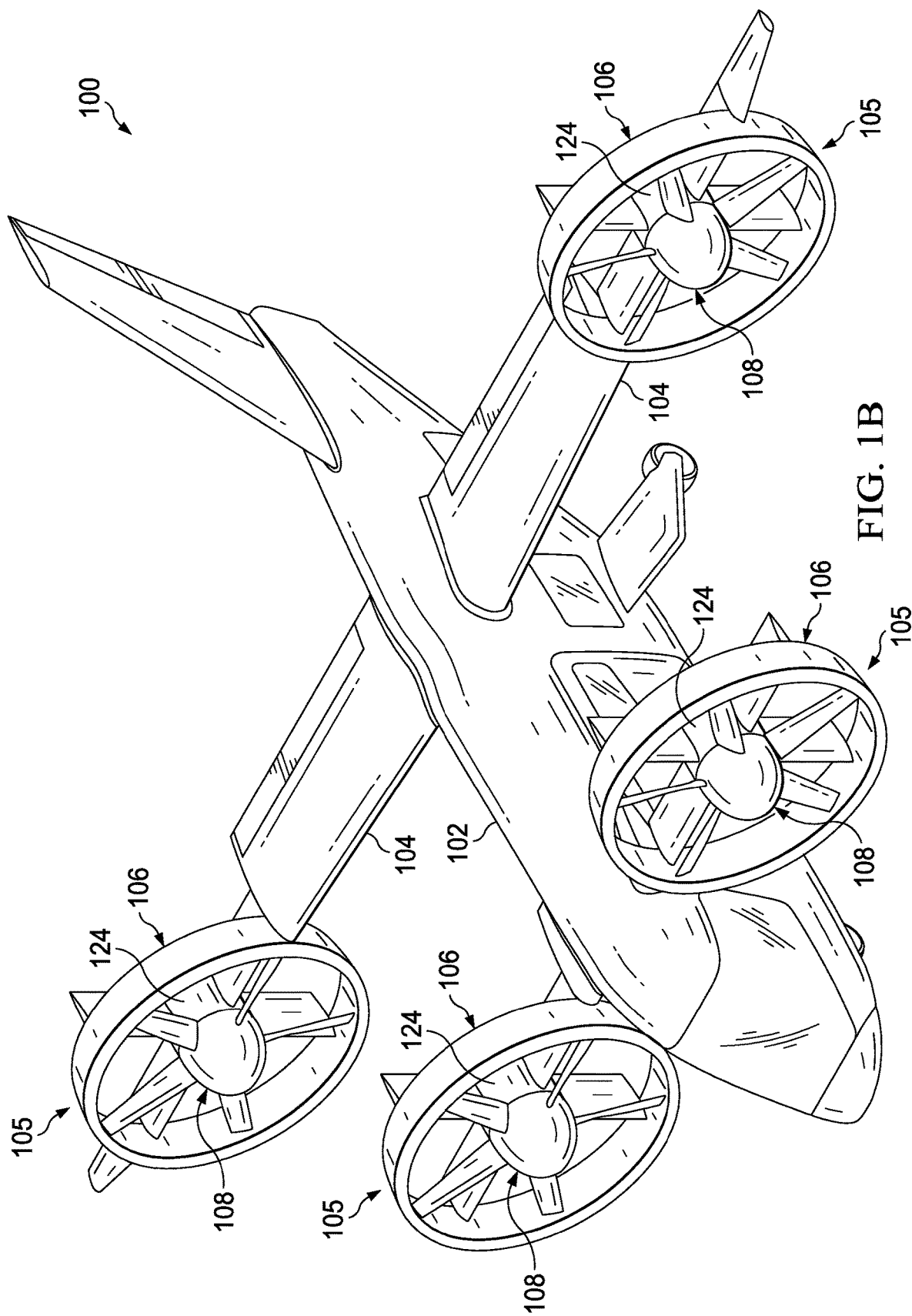

FIGS. 1A and 1B illustrate an example tiltrotor aircraft 100 that includes ducted rotors (or fans). The tiltrotor aircraft 100 is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wings 104, and a plurality propulsion assemblies 105 each comprising a ducted fan 106 rotatably coupled to fuselage 102 or wings 104. Each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode and thrust while operating in airplane mode. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108, wherein the gearbox receives rotational energy from a driveshaft passing through an attachment post 122 and the adjacent stator vane 120.

Rotor blade assemblies 108 can be collectively manipulated to selectively control direction, thrust, and lift of tilting ducted fan aircraft 100. Indeed, the collective pitch of rotor blade assemblies 108 may be independently controlled from one another to allow for differential thrust output by ducted fans 106. For example, the collective pitch of the rotor blade assembly of one ducted fan may be higher or lower than the collective pitch of rotor blade assembly of another ducted fan such that the thrust generated by each ducted fan differs from each of the others.

Ducted fans 106 are each convertible, relative to fuselage 102, between a horizontal position, as shown in FIG. 1A, and a vertical position, as shown in FIG. 1B. Ducted fans 106 are in the horizontal position during vertical takeoff and landing mode. Vertical takeoff and landing mode may be considered to include hover operations of tilting ducted fan aircraft 100. Ducted fans 106 are in the vertical position during forward flight mode, in which tilting ducted fan aircraft 100 is in forward flight. In forward flight mode, ducted fans 106 direct their respective thrusts in the aft direction to propel tilting ducted fan aircraft 10 forward. Tilting ducted fan aircraft 100 is operable to fly in all directions during the vertical takeoff and landing mode configuration of FIG. 1A, although faster forward flight is achievable while in the forward flight mode configuration of FIG. 1B. Ducted fans 106 may be tiltable between the vertical and horizontal positions by a rotatable shafts (not shown) extending through wings 104 and which are rotatable in response to commands originating from a pilot and/or a flight control system. Each of the propulsion assemblies 105 utilizes an electric motor and gearbox unit (described below) disposed within a respective rotatable pylon 124 as a power source to rotate the respective rotor hub assembly 108 via a rotor mast.

Figure 2:
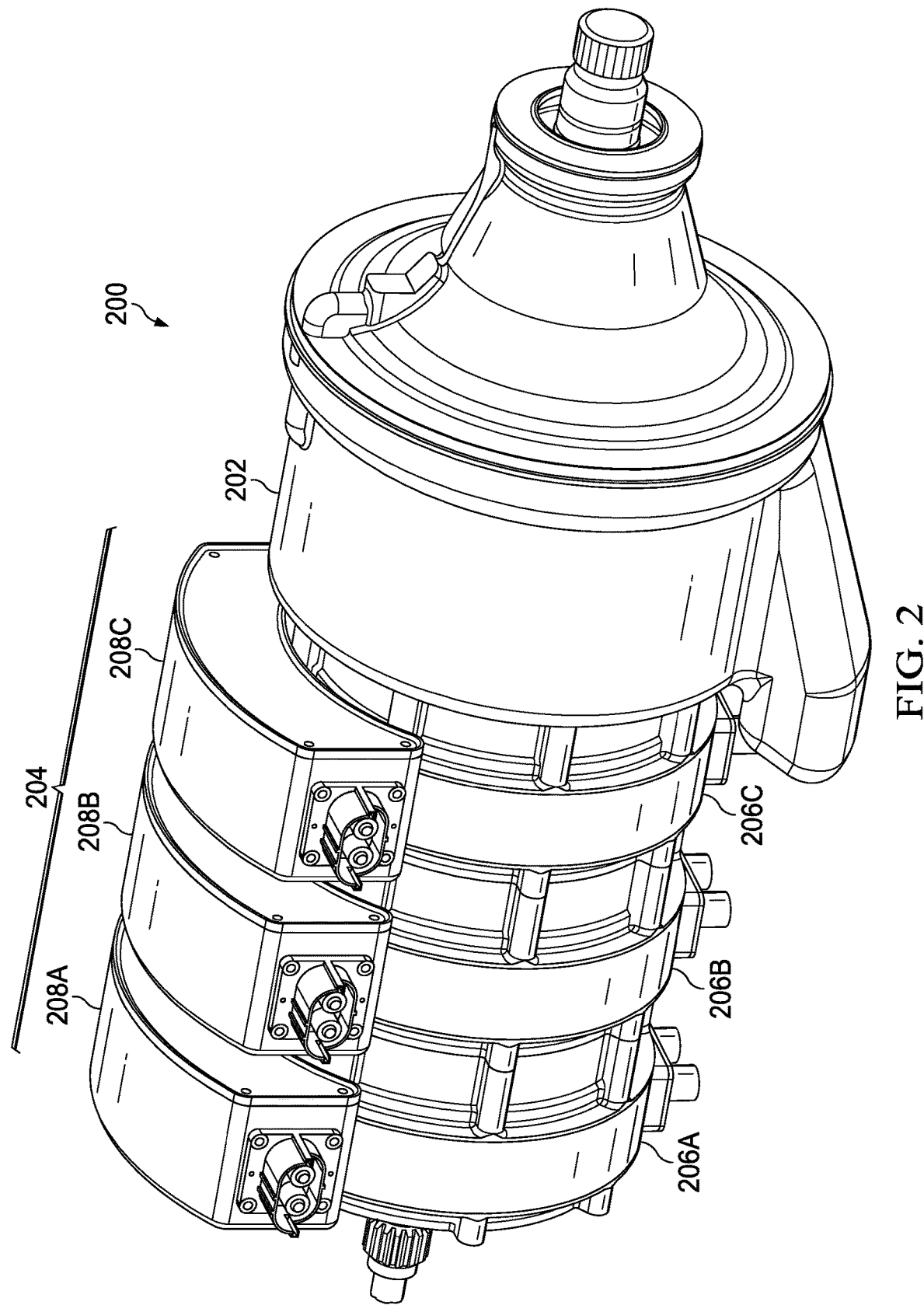
FIG. 2 illustrates an exterior of an example electric motor and gearbox unit including driveshaft concentric large bore oil pumps for each of the motors thereof in accordance with embodiments described herein for implementation in aircraft having ducted rotors, such as that illustrated in FIGS. 1A-1B.
Figure 3:
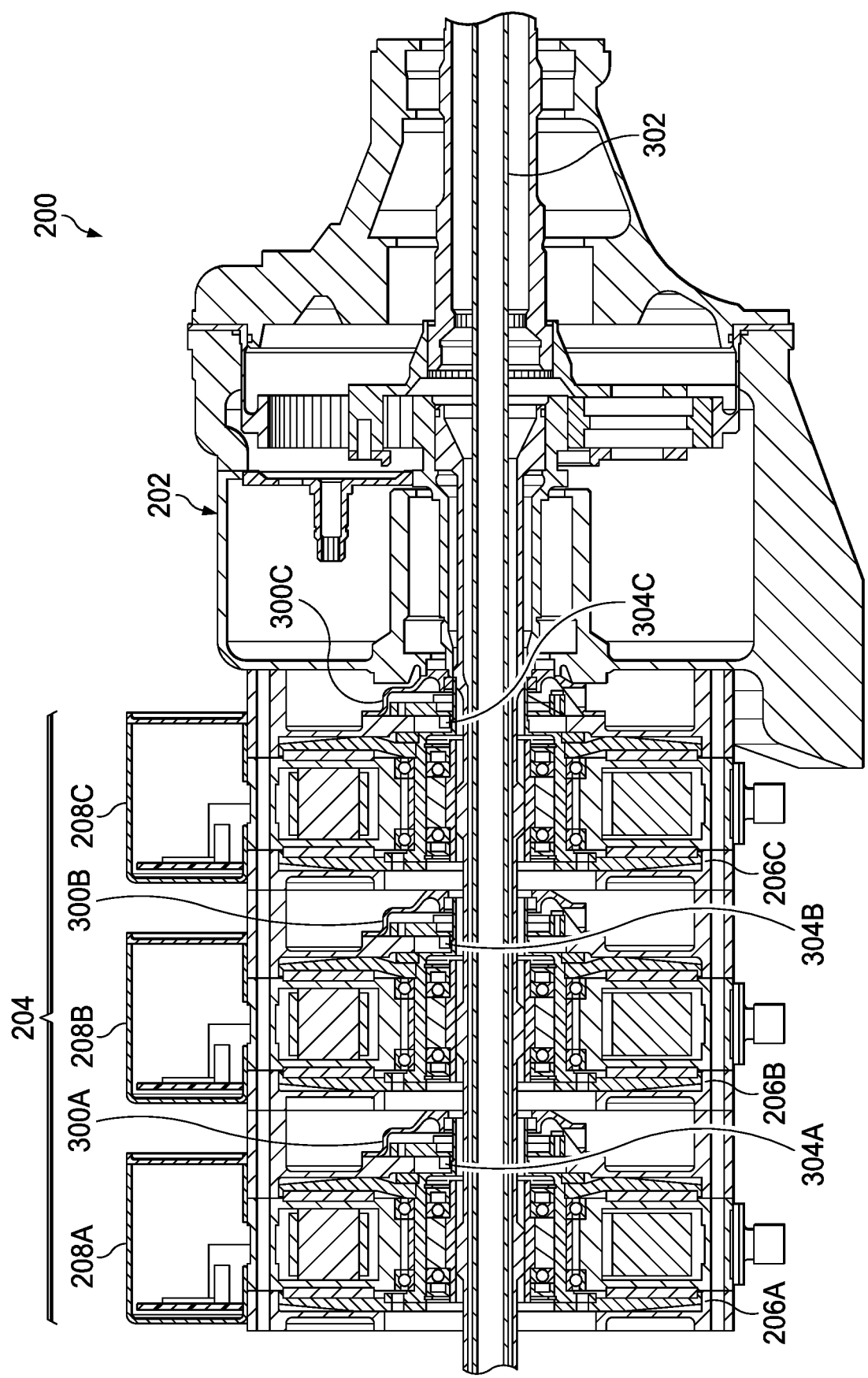
FIG. 3 illustrates a cutaway view of the example electric motor and gearbox unit including driveshaft concentric large bore oil pumps for each of the motors shown in FIG. 2.

Referring now to FIG. 2, illustrated therein is an electric motor and gearbox unit 200 that may be used as a power source to rotate a rotor hub assembly, such as rotor hub assembly 108 (FIGS. 1A and 1B). In certain embodiments, the electric motor and gearbox unit 200 is disposed within rotatable pylon 124 As shown in FIG. 2, the unit 200 includes a gear box 202 and an electric motor stack 204 comprising a plurality of electric motors 206A-206C and associated power electronics 208A-208C. FIG. 3 illustrates a cutaway view of the electric motor and gearbox unit 200. As shown in FIG. 3, in accordance with features of embodiments described herein, large bore oil pump assemblies 300A-300C are provided in connection with the electric motors 206A-206C and are implemented concentric to a driveshaft 302, which is disposed through and driven by the electric motor and gearbox unit 200 for rotating the rotor hub assembly 108. As shown in FIG. 3, overrunning (or "one-way") clutches 304A-305C are provided for preventing a failure of a single one of the motors 206A-206C from causing the driveshaft 302 to seize or from affecting the speed of the remaining motors.

Figure 4:
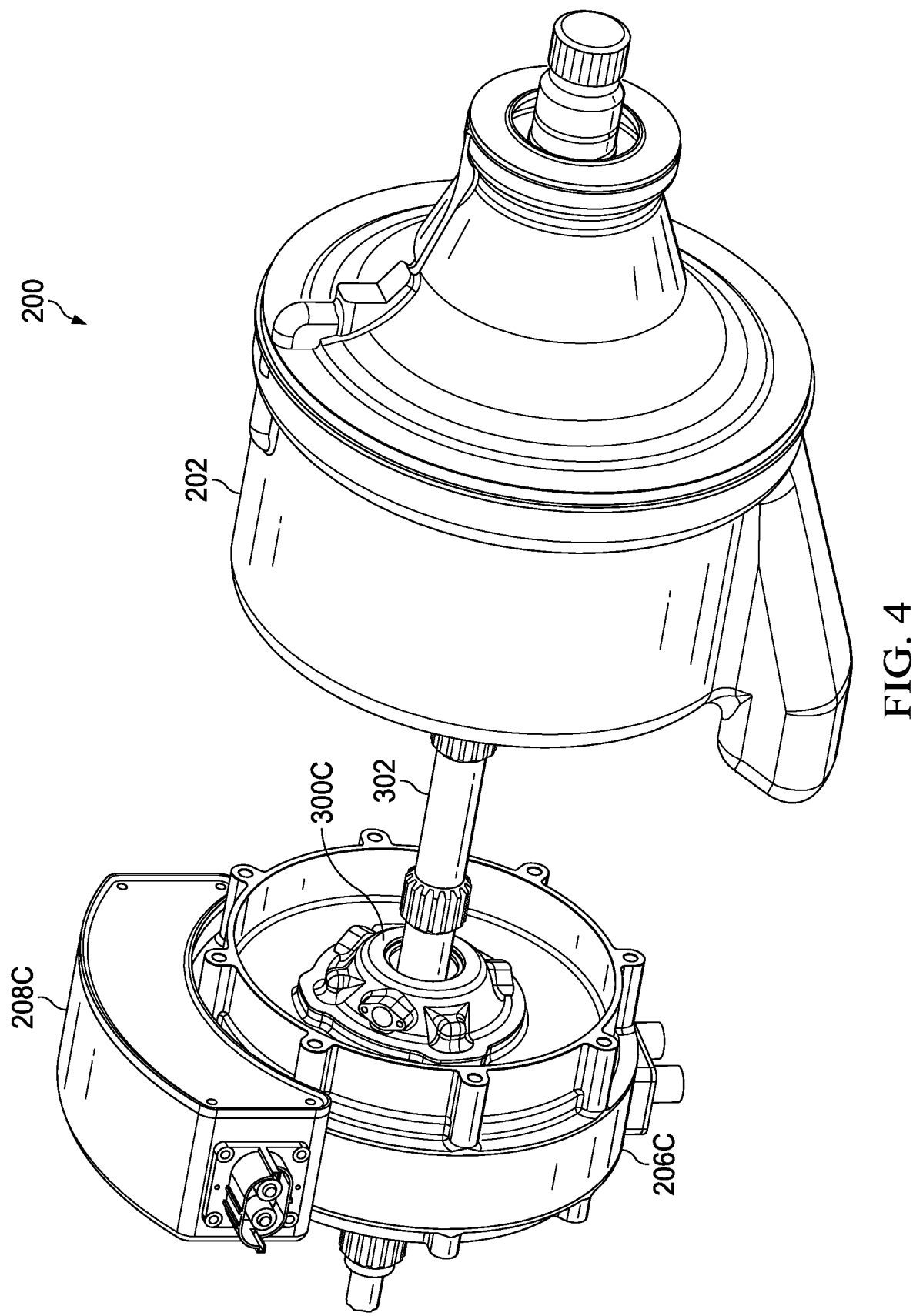
FIG. 4 illustrates a partially exploded view of a portion of the electric motor and gearbox unit shown in FIG. 2 showing one of the driveshaft concentric large bore oil pumps.
Figure 5:
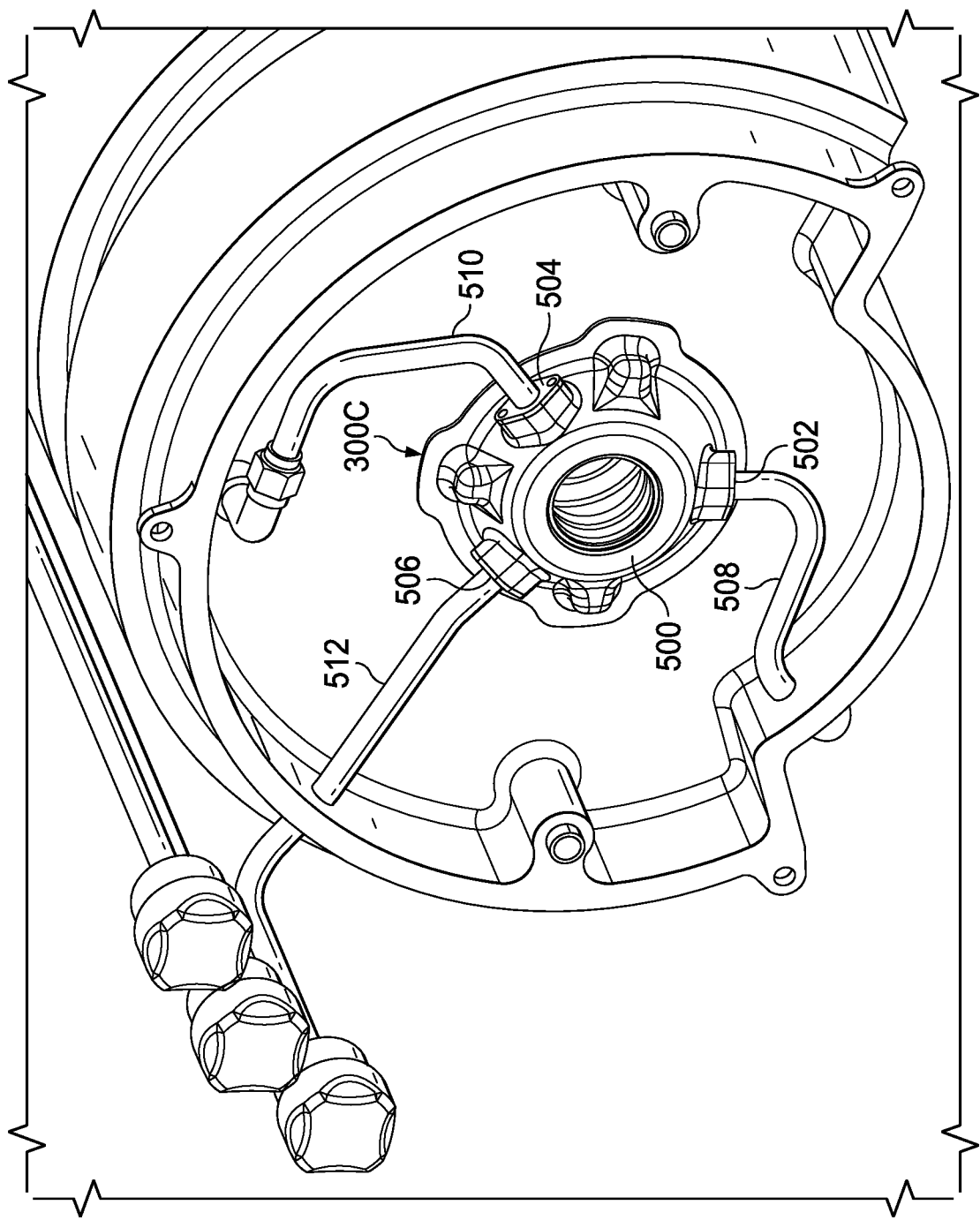
FIG. 5 illustrates one of the driveshaft concentric large bore oil pumps in situ in the electric motor and gearbox unit shown in FIG. 2.

FIG. 4 is a partially exploded view of an interconnection between the electric motor 206C and the gearbox 202 showing the large bore oil pump assembly 300C (which is identical to and representative of large bore oil pump assemblies 300A, 300B) in greater detail. FIG. 5 is a still more detailed view of the large bore oil pump assembly 300C situated on the electric motor 206C. The driveshaft is not shown in FIG. 5 so that the large bore oil pump assembly 300C may be more clearly shown and described. As shown in FIG. 5, the large bore oil pump assembly 300C comprises a pump cover 500, which functions as a sump for the pump 500C. The cover 500 includes three ports, including an inlet port 502, an outlet port 504, and a fill port 506, respectively connected to an inlet tube 508, an outlet tube 510, and a fill tube 512 for carrying fluid (e.g., oil) into and out of the pump assembly 300C as appropriate. The end of inlet tube 508 opposite inlet port 502 is connected to a heat exchanger of electric motor and gearbox unit 200. The end of outlet tube 510 opposite outlet port 504 is connected to internal components of motor 206C that are oil-cooled (e.g., power electronics 208C and stator). The end of fill tube 512 opposite the fill port 506 originates at a vented fill cap.

Figure 6:
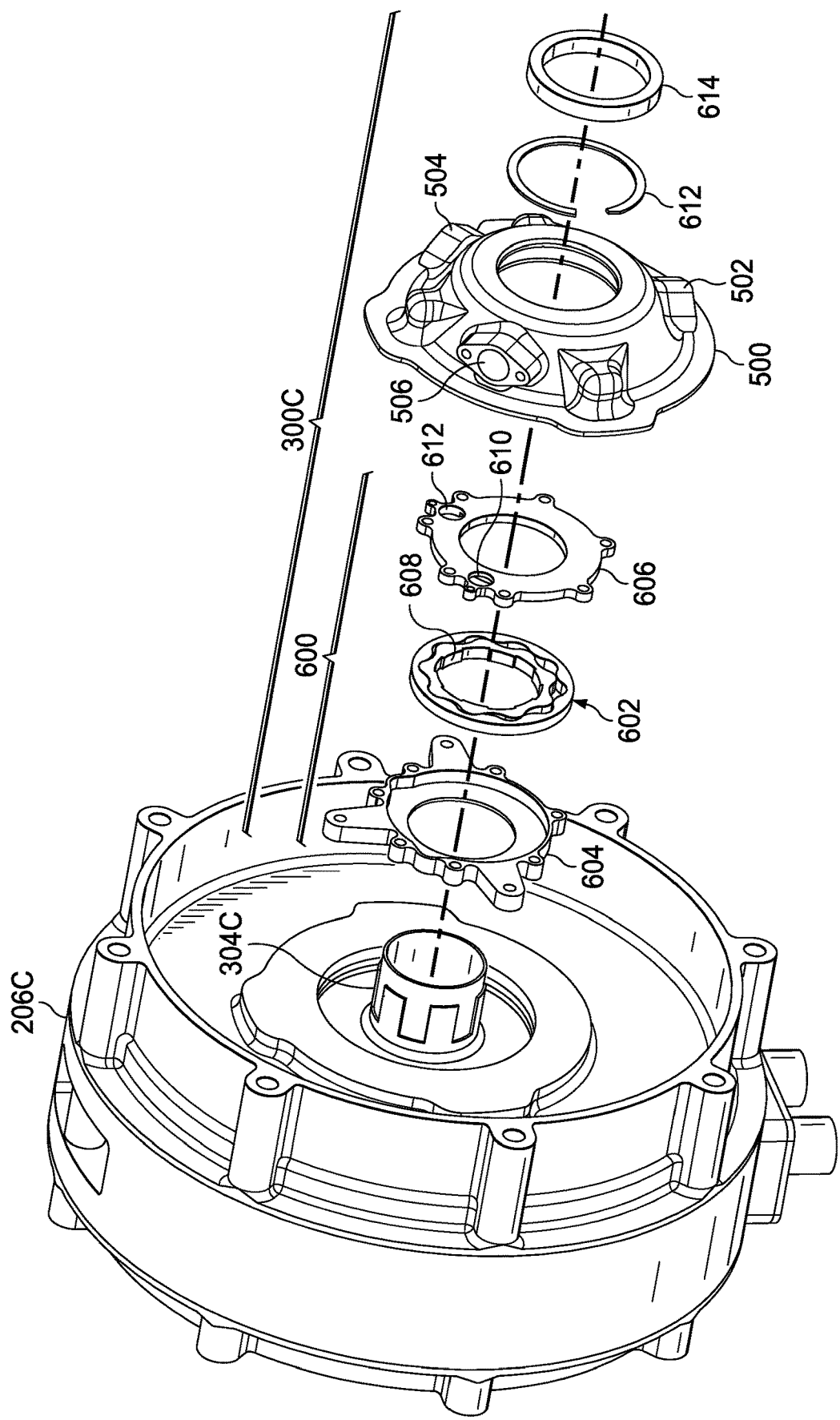
FIG. 6 illustrates an exploded view of the driveshaft concentric large bore oil pump shown in FIG. 5.

FIG. 6 is an exploded view illustrating features of the large bore oil pump assembly 300C in greater detail. As shown in FIG. 6, elements of the large bore oil pump assembly 300C includes a gerotor pump 600 including gerotor pump gears 602 disposed within a gerotor pump housing comprising a back housing portion 604 and a front housing portion 606. Front housing portion 606 includes a gear inlet opening 610 and a gear outlet opening 612 that respectively correspond to an inlet and an outlet of gears 602, as described below. Additionally, gear outlet opening 612 corresponds to and aligns with outlet port 504. In contrast, gear inlet opening 610 need not correspond to/align with inlet port 502, as the pump 600 will be floating in a volume of fluid (e.g., oil) such that as fluid is returned to the "sump" volume around the pump (as enabled by the cover 500), the pump 600 will intake fluid from the fluid in which it is submerged.

In accordance with features of embodiments described herein, an inner gerotor bore 608 of the gerotor pump gears 602 has a diameter large enough to accommodate the overrunning clutch 304C of the electric motor 206C therethrough. Low profile drive teeth disposed around overrunning clutch 304C mate with similar teeth disposed on inner gerotor bore 608 such that gerotor pump gears 602 are rotationally driven by the clutch (which is driven by the electric motor 206C). The sump cover 500 is disposed over the gerotor pump 600 and is sealed to overrunning clutch 304C via a lock ring 612 and lip seal 614.

Figure 7A:
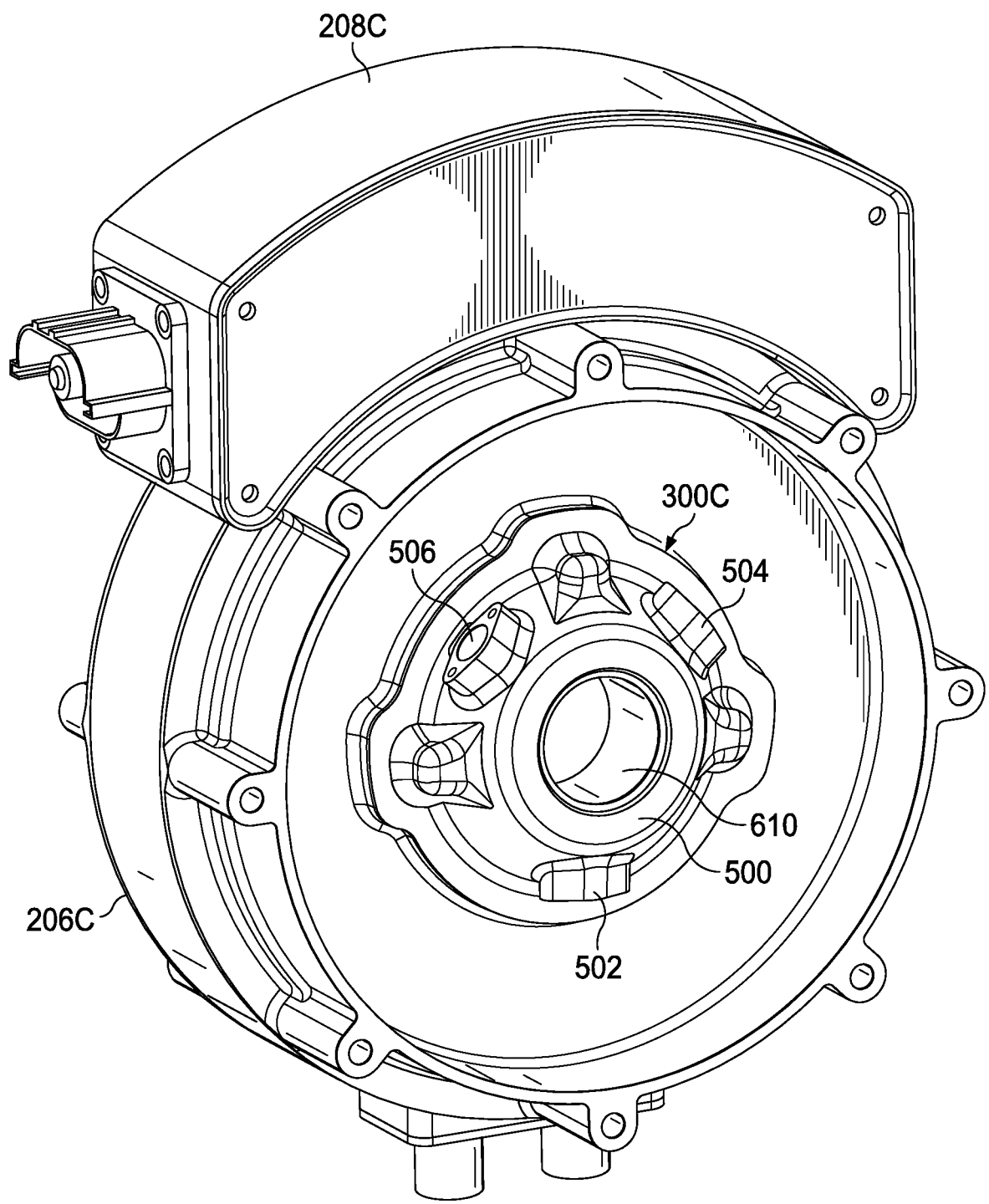
FIGS. 7A-7C illustrate various views of the driveshaft concentric large bore oil pump shown in FIG. 5.
Figure 7B:
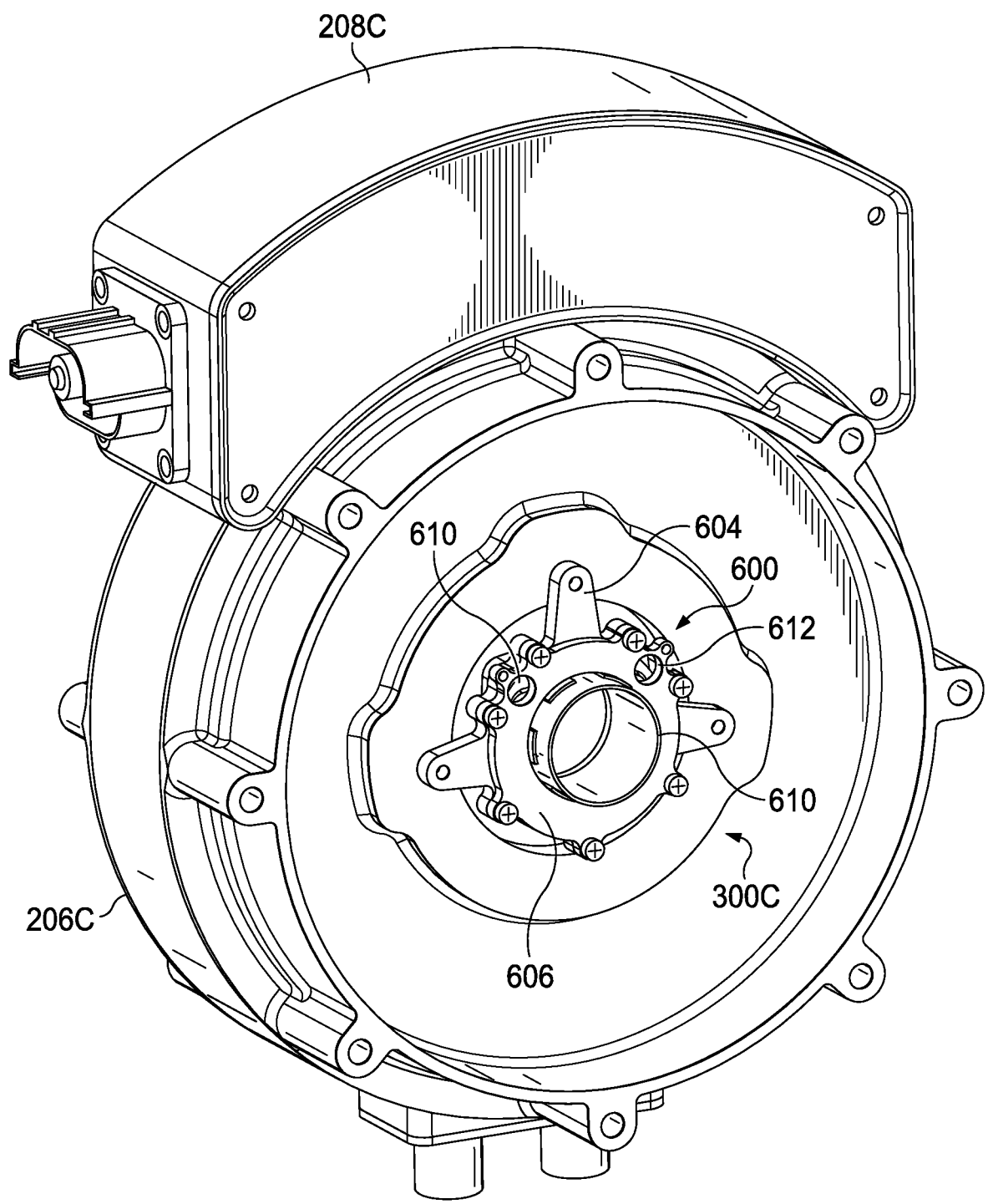
Figure 7C:
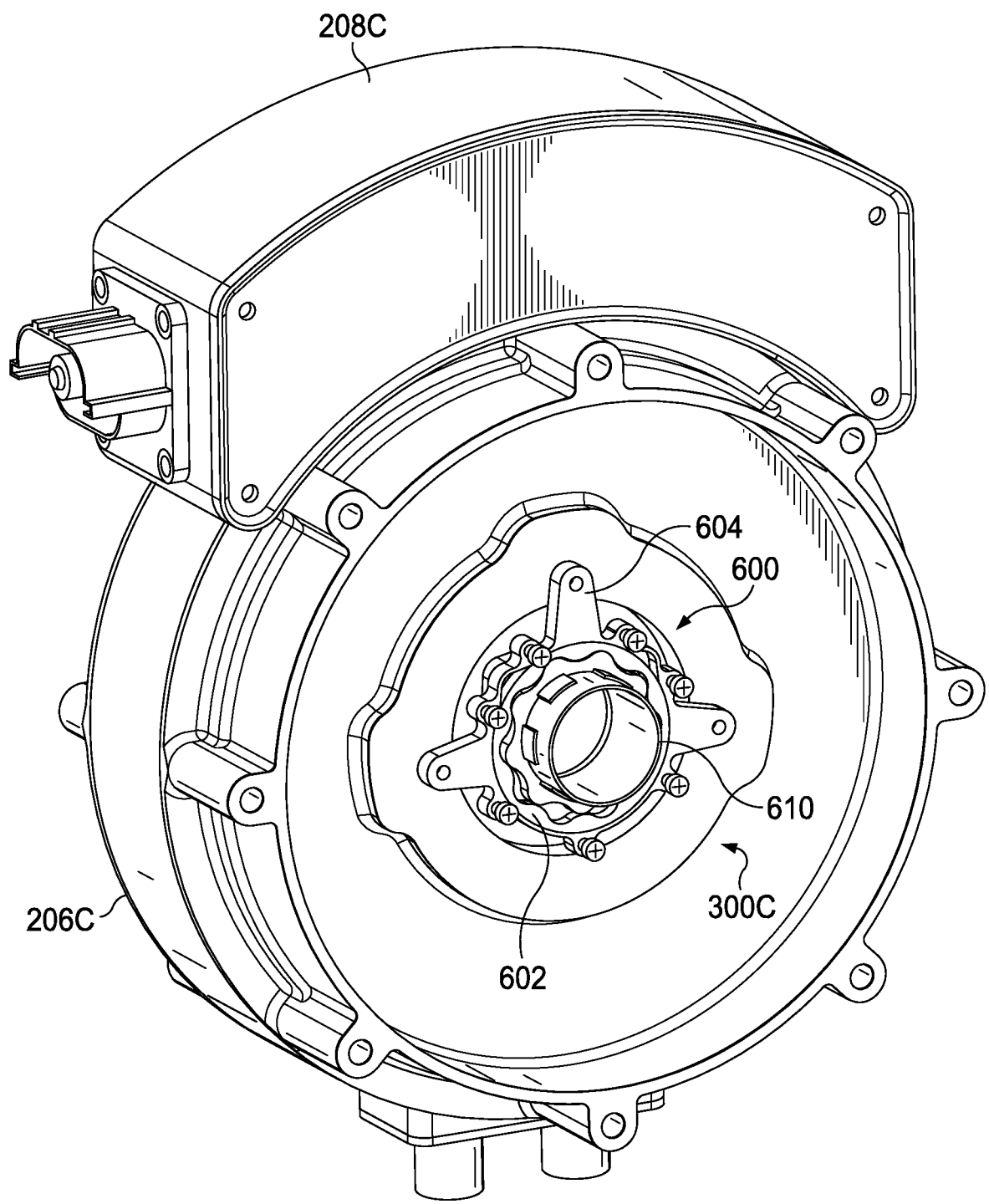

FIGS. 7A-7C illustrate various cutaway views of the large bore oil pump assembly 300C in situ attached to the electric motor 206C, with the driveshaft omitted for clarity. In particular, FIG. 7A illustrates large bore oil pump assembly 300C completely assembled with the sump cover 500 in place and sealed to the overrunning clutch 610. FIG. 7B illustrates the large bore oil pump assembly 300C with the sump cover 500 removed to reveal aspects of the gerotor pump 600. FIG. 7C illustrates the large bore oil pump assembly 300C with the front housing portion 606 removed to reveal the innerworkings of the gerotor pump 600, including gears 602.

Figure 8A:
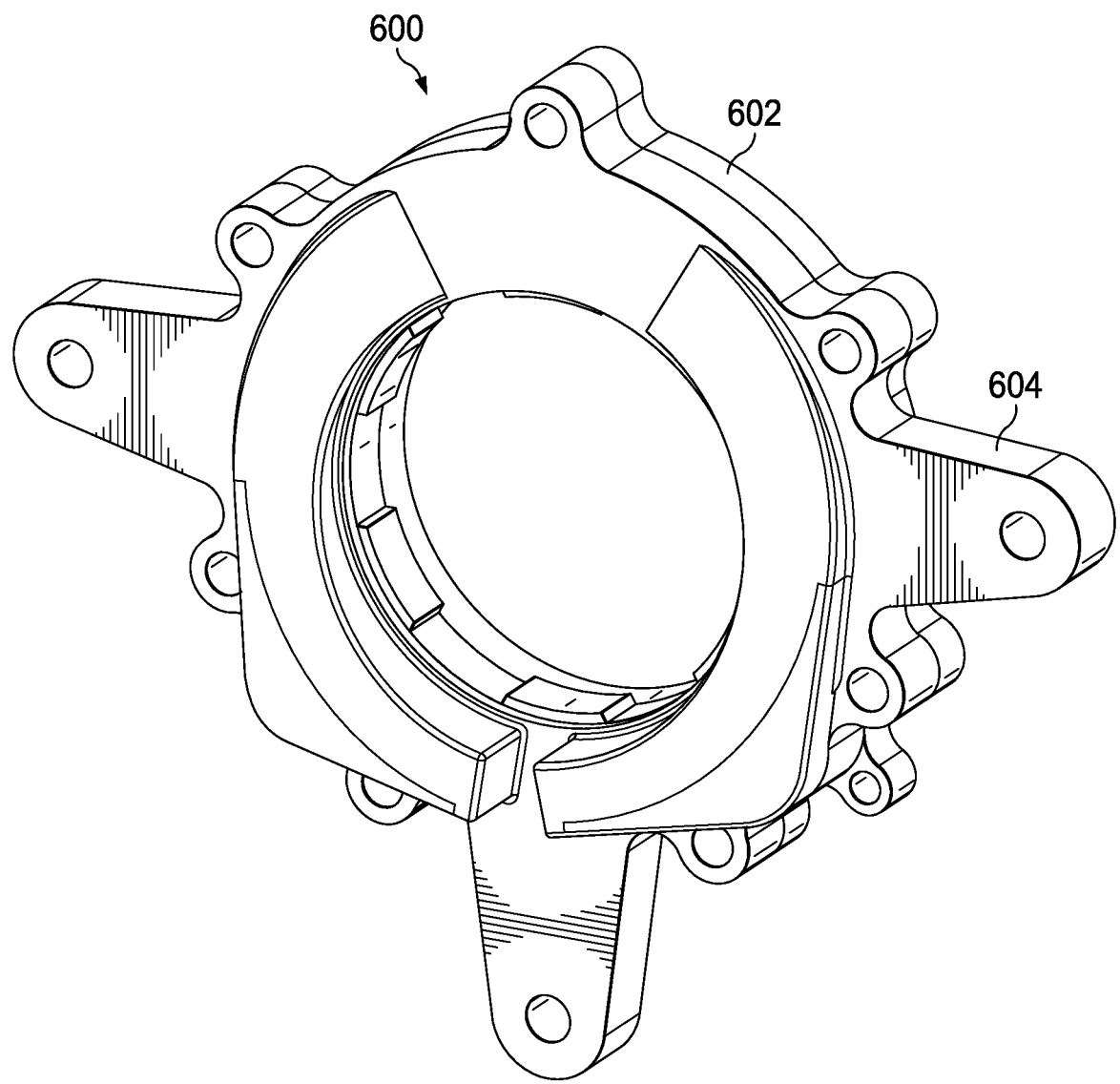
FIGS. 8A-8C illustrate various views of a gerotor for implementing the driveshaft concentric large bore oil pump shown in FIG. 5.
Figure 8B:
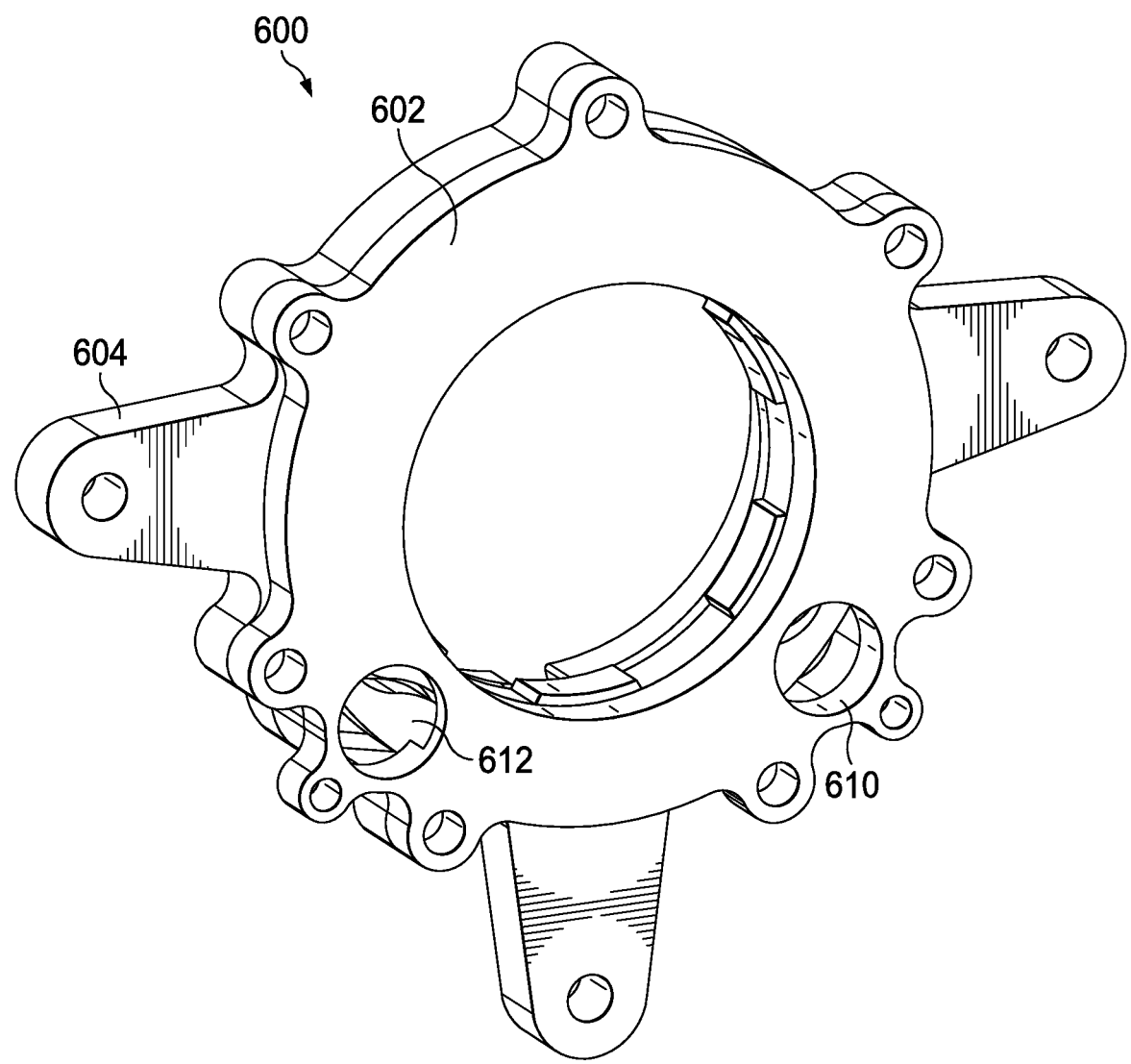
Figure 8C:
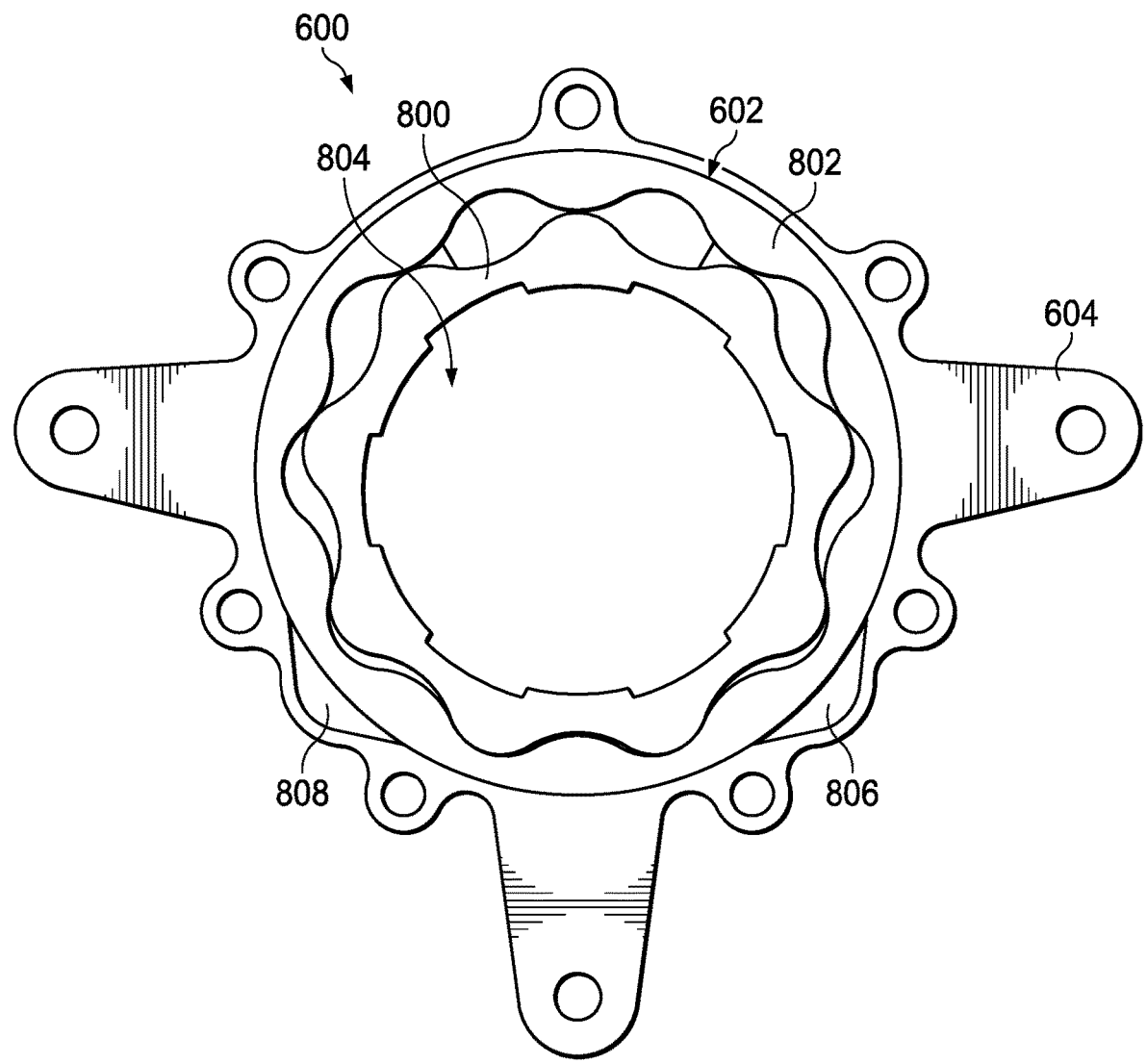

FIGS. 8A-8C illustrates various views of the large bore oil pump assembly 300C. In particular, FIGS. 8A and 8B respectively illustrate rear and front perspective views of the gerotor pump 600. FIG. 8C illustrates a front perspective view of the large bore oil pump assembly 300C with the front housing portion removed to reveal the gerotor pump gears 602, including an inner gear 800 and an outer gear 802. An inner gear rotor bore 804 includes teeth for mating with teeth of the overrunning clutch (not shown in FIG. 8C) such that inner gear 800 is driven by the overrunning clutch disposed around the driveshaft (not shown in FIG. 8C), as described above. In the illustrated embodiment, the pump gears 602 turn counterclockwise, such that fluid is drawn into the gears via an inlet 806 and expelled from gears via an outlet 808.

Figure 9A:
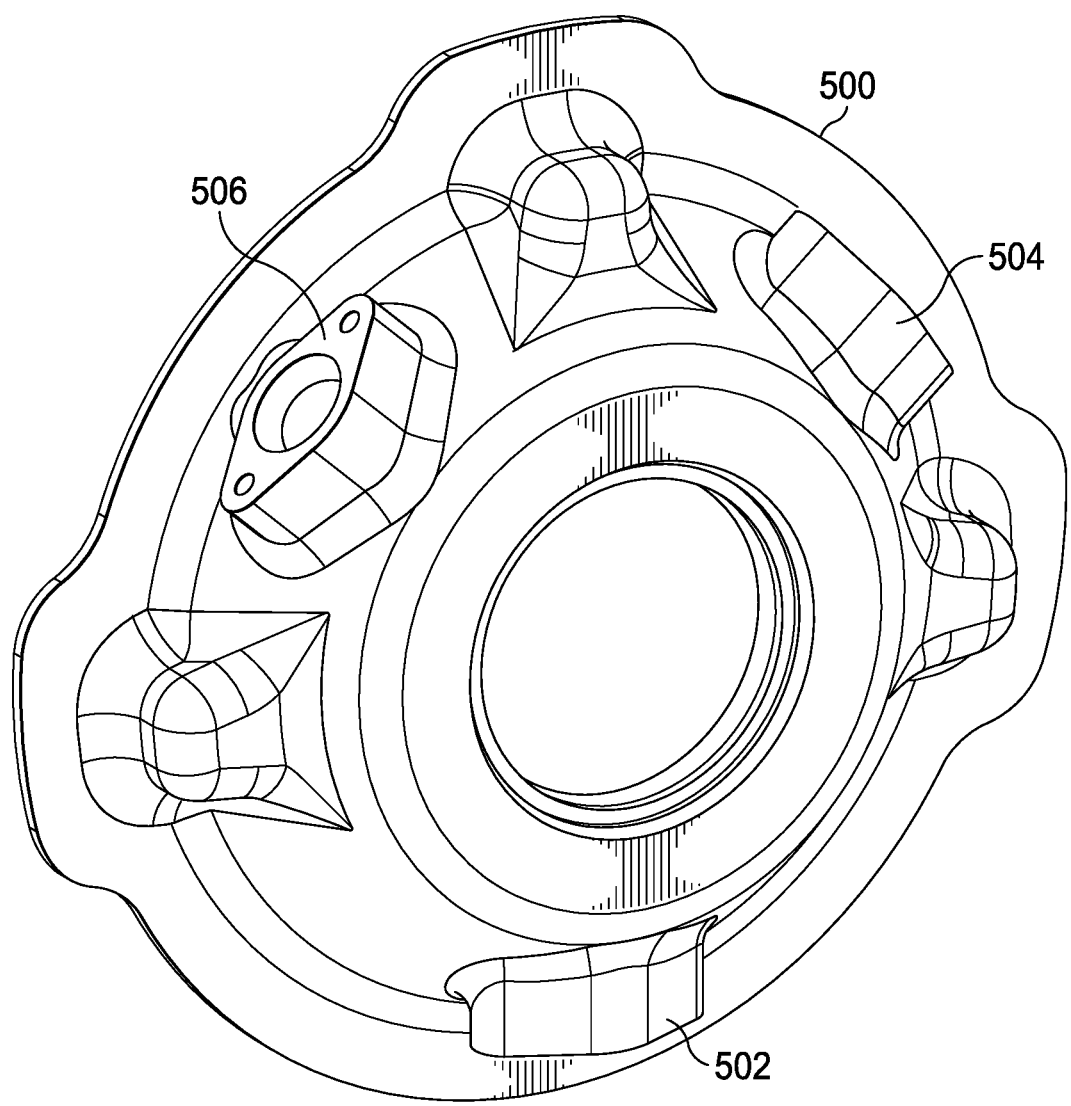
FIGS. 9A-9B illustrate various views of a sump cover for implementing the driveshaft concentric large bore oil pump shown in FIG. 5.
Figure 9B:
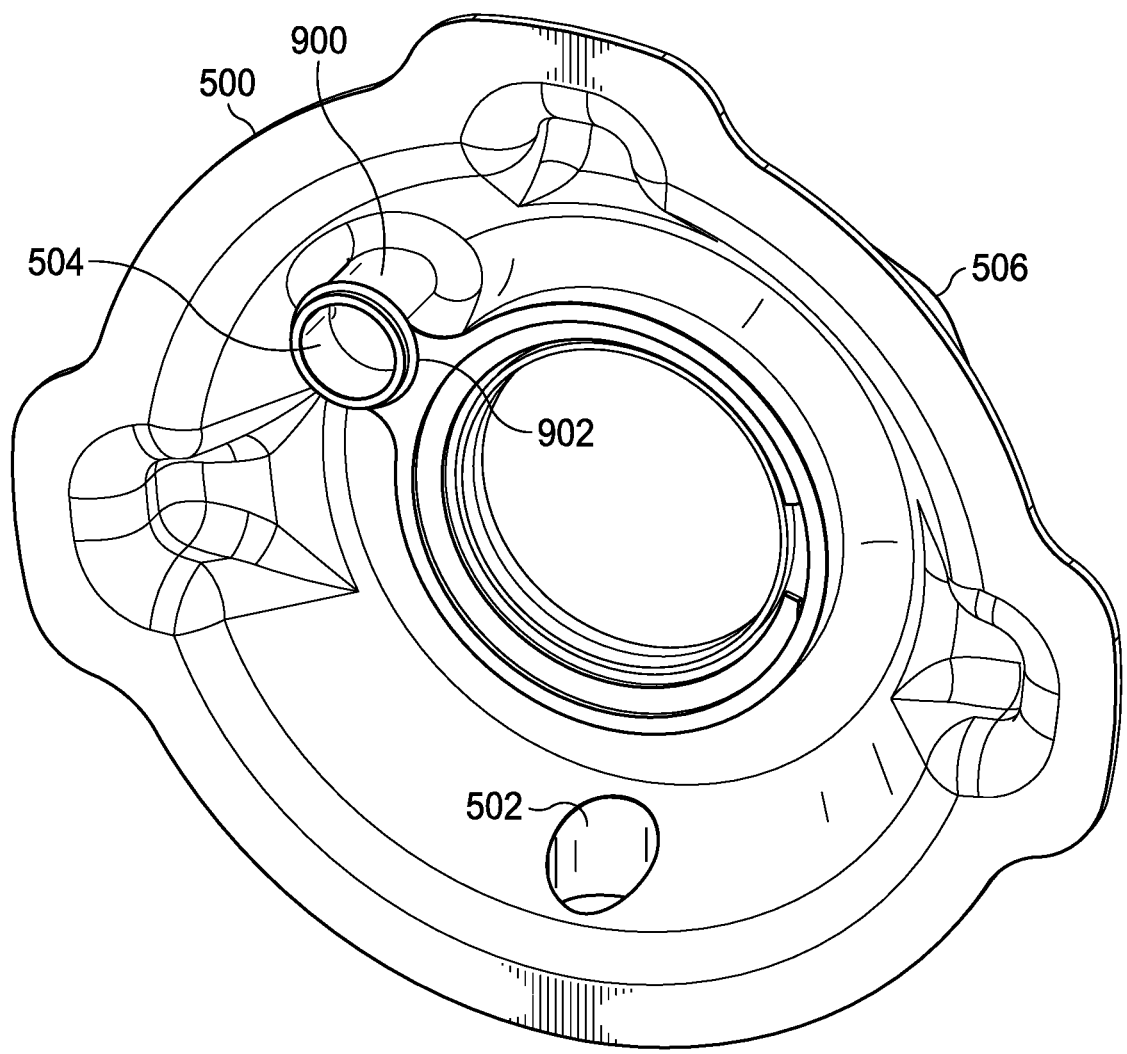

FIGS. 9A and 9B illustrate front and rear views, respectively, of the sump cover 500. As best shown in FIG. 9B, a short transfer tube 900 including an o-ring 902 is integral to cover 500 and plugs into and seals pump outlet 808 (FIG. 8) to provide the fluid connection for the outlet tube 510 (FIG. 5).

In certain embodiments, pump gears 602 may be made of steel, sump cover 500 may be made of aluminum, steel, and/or polymer material, and housings 604, 606, may be made of aluminum or steel.

It should be appreciated that aircraft illustrated herein, such as ducted rotor aircraft 100, is merely illustrative of a variety of aircraft that can implement the embodiments disclosed herein. Indeed, the various embodiments described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

The components of rotor assembly 108 may comprise any materials suitable for use with an aircraft rotor. For example, rotor blades 114 and rotor hub 124 may comprise carbon fiber or aluminum; and rotor mast 128, control tube 130, rotor hub 124, outer race 142, inner race 152, mast nut 168, mast adapter 146 may comprise steel or titanium. While rotor hub assembly 108 are shown with four rotor blades 114, respectively, it should be understood that they may have as few as two rotor blades and may have more than four rotor blades.

Example 1 is a rotor system including a driveshaft; at least one motor for providing rotational energy for the driveshaft; an overrunning clutch connected to the motor and disposed around the driveshaft, wherein the overrunning clutch is rotated by the at least one motor; a pump assembly associated with the at least one motor, the pump assembly including a large bore through which the driveshaft passes such that the pump assembly is arranged concentric to the driveshaft, the pump assembly further including a gerotor pump including inner and outer gerotor pump gears, wherein an inner bore of the gerotor pump engages and is driven by the overrunning clutch; and a cover disposed over the gerotor pump for providing a sump for the gerotor pump.

In Example 2, the rotor system of Example 1 may further include an outer circumference of the overrunning clutch including a plurality of teeth for engaging a plurality of teeth disposed on an inner circumference of the inner gear bore.

In Example 3, the rotor system of either of Examples 1 or 2 may further include the pump cover further including an inlet port for receiving fluid into the pump assembly and an outlet port for expelling fluid from the oil pump.

In Example 4, the rotor system of any of Examples 1-3 may further include the outlet port further including a transfer tube for connecting to an outlet of the gerotor pump.

In Example 5, the rotor system of any of Examples 1-4 may further include an input tube connected to the inlet port for providing fluid to the pump assembly via the inlet port and an output tube for expelling fluid from the pump assembly via the outlet port.

In Example 6, the rotor system of any of Examples 1-5 may further include the cover further including a fill port connected to a fill tube.

In Example 7, the rotor system of any of Examples 1-6 may further include the gerotor pump being disposed within a housing.

In Example 8, the rotor system of any of Examples 1-7 may further include the housing including a front housing portion secured to a back housing portion.

In Example 9, the rotor system of any of Examples 1-8 may further include the fluid comprising oil.

Example 10 is a rotorcraft including a rotor system, the rotor system including a driveshaft; at least one motor for providing rotational energy for the driveshaft; an overrunning clutch connected to the motor and disposed around the driveshaft, wherein the overrunning clutch is rotated by the at least one motor; a pump assembly associated with the at least one motor, the pump assembly including a large bore through which the driveshaft passes such that the pump assembly is arranged concentric to the driveshaft, the pump assembly further including a gerotor pump including inner and outer gerotor pump gears, wherein an inner bore of the gerotor pump engages and is driven by the overrunning clutch; and a cover disposed over the gerotor pump for providing a sump for the gerotor pump.

In Example 11, the rotorcraft of Example 10 may further include an outer circumference of the overrunning clutch including a plurality of teeth for engaging a plurality of teeth disposed on an inner circumference of the inner gear bore.

In Example 12, the rotorcraft of either of Examples 10 or 11 may further include the pump cover including an inlet port for receiving fluid into the pump assembly and an outlet port for expelling fluid from the oil pump and the outlet port further including a transfer tube for connecting to an outlet of the gerotor pump.

In Example 13, the rotorcraft of any of Examples 10-12 may further include an input tube connected to the inlet port for providing fluid to the pump assembly via the inlet port and an output tube for expelling fluid from the pump assembly via the outlet port.

In Example 14, the rotorcraft of any of Examples 10-13 may further include the gerotor pump being disposed within a housing.

In Example 15, the rotorcraft of any of Examples 10-14 may further include the housing including a front housing portion secured to a back housing portion.

Example 16 is a pump assembly associated with a motor, the pump assembly including a large bore through which a driveshaft driven by the motor passes such that the pump assembly is arranged concentric to the driveshaft, the pump assembly further including a gerotor pump including inner and outer gerotor pump gears, wherein an inner bore of the gerotor pump engages and is driven by an overrunning clutch rotated by the motor and through which the drive shaft passes; and a cover disposed over the gerotor pump for providing a sump for the gerotor pump.

In Example 17, the pump assembly of Example 16 may further include an outer circumference of the overrunning clutch including a plurality of teeth for engaging a plurality of teeth disposed on an inner circumference of the inner gear bore.

In Example 18, the pump assembly of either of Examples 16 or 17 may further include the pump cover further including an inlet port for receiving fluid into the pump assembly and an outlet port for expelling fluid from the oil pump and the outlet port may further include a transfer tube for connecting to an outlet of the gerotor pump.

In Example 19, the pump assembly of any of Examples 16-18 may further include an input tube connected to the inlet port for providing fluid to the pump assembly via the inlet port and an output tube for expelling fluid from the pump assembly via the outlet port.

In Example 20, the pump assembly of any of Examples 16-19 may further include the gerotor pump being disposed within a housing.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system for a rotary aircraft, the rotor system comprising:
    a driveshaft for rotating a plurality of rotor blades of the rotary aircraft, wherein the plurality of rotor blades are mechanically connected to the driveshaft;
    at least one motor connected to the driveshaft for providing rotational energy to the driveshaft;
    an overrunning clutch connected to the at least one motor and disposed around the driveshaft, wherein the overrunning clutch is rotated by the at least one motor;
    a pump assembly associated with the at least one motor, wherein the driveshaft driven by the motor passes through the pump assembly such that the pump assembly is arranged concentric to the driveshaft, the pump assembly further comprising:
        a gerotor pump comprising inner and outer gerotor pump gears, wherein an inner bore of the gerotor pump engages and is driven by the overrunning clutch; and
        a cover enclosing a surface of the gerotor pump and sealed to the overrunning clutch to provide a sump for the gerotor pump.

2. The rotor system of claim 1, wherein an outer circumference of the overrunning clutch comprises a plurality of teeth for engaging a plurality of teeth disposed on an inner circumference of the inner bore.

3. The rotor system of claim 1 wherein the cover further comprises a fill port connected to a fill tube.

4. The rotor system of claim 1, wherein the gerotor pump is disposed within a housing.

5. The rotor system of claim 4, wherein the housing comprises a front housing portion secured to a back housing portion.

6. The rotor system of claim 1, wherein the cover further comprises an inlet port for receiving fluid into the pump assembly and an outlet port for expelling the fluid from the gerotor pump.

7. The rotor system of claim 6, wherein the outlet port further comprises a transfer tube for connecting to an outlet of the gerotor pump.

8. The rotor system of claim 6 further comprising an input tube connected to the inlet port for providing fluid to the pump assembly via the inlet port and an output tube for expelling the fluid from the pump assembly via the outlet port.

9. The rotor system of claim 6, wherein the fluid comprises oil.

10. A rotorcraft including a rotor system, the rotor system comprising:
   a driveshaft for rotating a plurality of rotor blades of the rotor, wherein the plurality of rotor blades are mechanically connected to the driveshaft;
   at least one motor connected to the driveshaft for providing rotational energy to the driveshaft;
   an overrunning clutch connected to the at least one motor and disposed around the driveshaft, wherein the overrunning clutch is rotated by the at least one motor;
   a pump assembly associated with the at least one motor, wherein the driveshaft driven by the motor passes through the pump assembly such that the pump assembly is arranged concentric to the driveshaft, the pump assembly further comprising:
      a gerotor pump comprising inner and outer gerotor pump gears, wherein an inner bore of the gerotor pump engages and is driven by the overrunning clutch; and
      a cover enclosing a surface of the gerotor pump and sealed to the overrunning clutch to provide a sump for the gerotor pump.

11. The rotorcraft of claim 10, wherein an outer circumference of the overrunning clutch comprises a plurality of teeth for engaging a plurality of teeth disposed on an inner circumference of the inner bore.

12. The rotorcraft of claim 10, wherein the cover further comprises an inlet port for receiving fluid into the pump assembly and an outlet port for expelling the fluid from the gerotor pump and wherein the outlet port further comprises a transfer tube for connecting to an outlet of the gerotor pump.

13. The rotorcraft of claim 12 further comprising an input tube connected to the inlet port for providing fluid to the pump assembly via the inlet port and an output tube for expelling the fluid from the pump assembly via the outlet port.

14. The rotorcraft of claim 10, wherein the gerotor pump is disposed within a housing.

15. The rotorcraft of claim 14, wherein the housing comprises a front housing portion secured to a back housing portion.

16. A pump assembly associated with a motor, wherein a driveshaft driven by the motor passes through the pump assembly such that the pump assembly is arranged concentric to the driveshaft, the driveshaft for rotating a plurality of rotor blades connected to the driveshaft, wherein the plurality of rotor blades are mechanically connected to the driveshaft, the pump assembly further comprising:
   a gerotor pump comprising inner and outer gerotor pump gears, wherein an inner bore of the gerotor pump engages and is driven by an overrunning clutch rotated by the motor and through which the driveshaft passes; and
   a cover enclosing a surface of the gerotor pump and sealed to the overrunning clutch to provide a sump for the gerotor pump.

17. The pump assembly of claim 16, wherein an outer circumference of the overrunning clutch comprises a plurality of teeth for engaging a plurality of teeth disposed on an inner circumference of the inner bore.

18. The pump assembly of claim 16, wherein the gerotor pump is disposed within a housing.

19. The pump assembly of claim 16, wherein the cover further comprises an inlet port for receiving fluid into the pump assembly and an outlet port for expelling the fluid from the gerotor pump and wherein the outlet port further comprises a transfer tube for connecting to an outlet of the gerotor pump.

20. The pump assembly of claim 19 further comprising an input tube connected to the inlet port for providing fluid to the pump assembly via the inlet port and an output tube for expelling the fluid from the pump assembly via the outlet port.

* * * * *